J. JONES, J. DUNKERLEY & J. DUNKERLEY.
Carriage Axle Boxes.

No. 138,091. Patented April 22, 1873.

Witnesses:

Inventor:
J. Jones
James Dunkerley
Joseph Dunkerley
per
Attorneys.

UNITED STATES PATENT OFFICE.

JOSEPH JONES, JAMES DUNKERLEY, AND JOSEPH DUNKERLEY, OF PATERSON, NEW JERSEY.

IMPROVEMENT IN CARRIAGE-AXLE BOXES.

Specification forming part of Letters Patent No. 138,091, dated April 22, 1873; application filed December 31, 1872.

*To all whom it may concern:*

Figure 1:
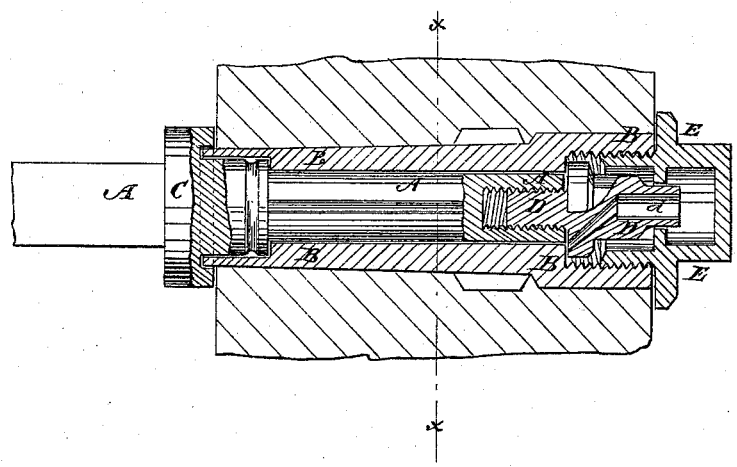
Figure 2:
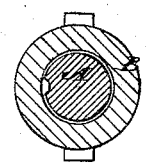

Be it known that we, JOSEPH JONES, JAMES DUNKERLEY, and JOSEPH DUNKERLEY, of Paterson, in the county of Passaic and State of New Jersey, have invented a new and useful Improvement in Axle and Box, of which the following is a specification:

Figure 1 is a detail longitudinal section of my improved axle and box. Fig. 2 is a detail cross-section of the same taken through the line $x\ x$, Fig. 1.

Similar letters of reference indicate corresponding parts.

Our invention has for its object to furnish an improved axle-arm and axle-box, which shall be so constructed as to prevent the entrance of mud and sand at the inner end of the hub, will hold the axle-box securely in place upon the axle-arm, and will enable the axle to be conveniently kept thoroughly lubricated, and which shall at the same time be simple in construction and convenient in use. The invention consists in the combination of the axle-arm, axle-box, perforated screw, and hollow screw-cap with each other, said parts being constructed and operating as hereinafter fully described.

A represents an axle-arm, and B represents an axle-box, which fits and revolves upon the axle A. The box B at its inner end is kept in place by a collar, C, formed upon the said axle A. The outer side of the collar C is recessed to receive the inner end of the box B, which end is allowed to project a little beyond the inner end of the hub for this purpose, so that mud and sand may be wholly prevented from working in at the end of the hub. The inner end of the box B is also reamed out and enlarged to form a shoulder to rest against a shoulder formed upon the axle A, to relieve the collar C from having to support the whole inward pressure of the wheel. In the outer end of the axle A is formed a screw-hole into which is screwed a screw, D, the head of which is made of a little larger diameter than the outer end of the axle A, so as to rest against a shoulder formed by reaming out or enlarging the outer end of the box B. The screw D projects beyond its head, and the projecting part $d'$ is perforated longitudinally, and from the inner end of said perforation an inclined hole is formed, leading out at the inner side of the head or flange of said screw D. E is the screw-cap, which screws into the recessed outer end of the box B, and which is flanged to overlap the outer end of the hub. The cap E is made hollow to serve as an oil-chamber, the inner wall of said cap being perforated to receive the perforated end $d'$ of the screw D, so that the oil from said chamber may pass through the perforations of the screw D to the axle-arm A, which is grooved longitudinally to conduct the oil to the inner part of said axle, and thus lubricate its entire surface. The box B has lugs formed upon its outer surface to prevent it from turning in the hub, and its outer end is made the larger so that it may be driven into the hub from its outer end.

Having thus described our invention, we claim as new and desire to secure by Letters Patent—

The combination of the axle-arm A, axle-box B, perforated screw D, and hollow screw-cap E, constructed to operate substantially as herein shown and described, and for the purpose set forth.

JOSEPH JONES.
JAMES DUNKERLEY.
JOSEPH $+$ DUNKERLEY.
<sub>his</sub> <sub>mark.</sub>

Witnesses:
WILLIAM TAYLOR,
SAMUEL URMSON.